S. G. ROWE.
Improvement in Connecting Wagon-Bodies to Perches.

No. 128,511.                        Patented July 2, 1872.

Witness
J. A. Asker
John Williams

Inventor
S. G. Rowe
Per Wm. Franklin Seavey
Atty

No. 128,511

UNITED STATES PATENT OFFICE.

SUMNER G. ROWE, OF DOVER, MAINE.

IMPROVEMENT IN CONNECTING WAGON-BODIES TO PERCHES.

Specification forming part of Letters Patent No. 128,511, dated July 2, 1872.

*To all whom it may concern:*

Be it known that I, SUMNER G. ROWE, of Dover, in the county of Piscataquis and State of Maine, have invented a certain new and useful Improvement in Wagons; and I hereby declare the following to be a full, clear, and exact description thereof, which will enable others to make and use the same, reference being had to the accompanying drawing, in which is shown at—

Figure 2:
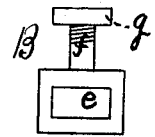
Figure 2:
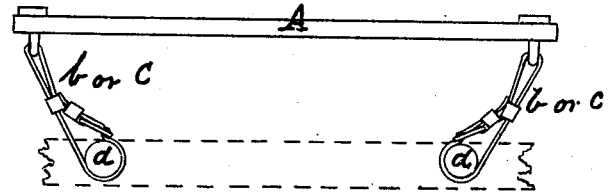
Figure 1:
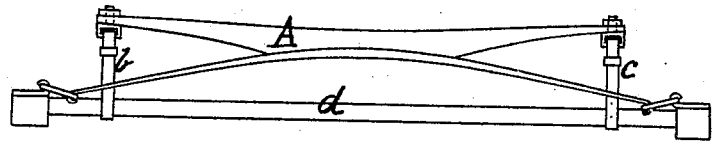

Figure 1 a side view of my invention; Fig. 2, an end view of same.

Same letters show like parts.

My improvement is designed especially to apply to side-spring wagons, and is for the purpose of preventing too much motion of the wagon-body when entering from the side, or when the load is unevenly distributed. My invention tends to keep the body of the wagon level or nearly so under all circumstances, relieving the springs from strain, while at the same time it does not interfere with the easy riding of the vehicle.

I effect my purpose by attaching to each corner of the wagon-body a strap, which passes down around the wagon-perch or is secured to it in any convenient manner. These straps are buckled down sufficiently tight to keep the wagon-body always nearly level. If the wagon be unevenly loaded the straps on the end or side (as the case may be) prevent its rising or tipping beyond a certain distance, which distance may be regulated by loosening or tightening the straps. They also prevent the "jump" of the body when going over a rough road, thus relieving the springs from strain. They also prevent sidewise motion of the body when going round a corner, keeping the body always equidistant from the perches.

I have also an improved device for attaching these straps to the wagon-body, consisting of an eye having a screw-bolt attached, which passes up through the body and is secured by a nut.

In the drawing, A shows the wagon-body; $b$ and $c$, Fig. 1, one of the front and back straps, respectively; $d$, the perch, around which they pass and are fastened. Fig. 2 represents either a front or rear view, the arrangement of the straps being identical. Detail B shows the device above referred to for attaching the straps to the wagon-body; $e$, the eye; $f$, the screw-bolt; and $g$, the nut.

What I claim as my invention, and desire to secure by Letters Patent, is—

The combination of the straps $b\ b$ and eye-bolts B with the body and perches of a wagon, said straps being arranged at the corners of said body, as set forth.

SUMNER G. ROWE.

Witnesses:
WM. FRANKLIN SEAVEY,
JOHN WILLIAMS.